(12) United States Patent
Yamada et al.

(10) Patent No.: US 10,975,195 B2
(45) Date of Patent: Apr. 13, 2021

(54) POLYCARBONATE RESIN COMPOSITION AND MOLDED BODY OF SAME

(71) Applicant: IDEMITSU KOSAN CO., LTD., Tokyo (JP)

(72) Inventors: Aki Yamada, Sodegaura (JP); Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/561,953

(22) PCT Filed: Mar. 29, 2016

(86) PCT No.: PCT/JP2016/060274
§ 371 (c)(1),
(2) Date: Sep. 26, 2017

(87) PCT Pub. No.: WO2016/159025
PCT Pub. Date: Oct. 6, 2016

(65) Prior Publication Data
US 2018/0127542 A1 May 10, 2018

(30) Foreign Application Priority Data
Mar. 30, 2015 (JP) .............................. JP2015-070155

(51) Int. Cl.
*C08G 64/18* (2006.01)
*C08L 69/00* (2006.01)
(Continued)

(52) U.S. Cl.
CPC ......... *C08G 64/186* (2013.01); *C08G 64/085* (2013.01); *C08G 64/18* (2013.01);
(Continued)

(58) Field of Classification Search
CPC .... C08G 64/186; C08G 64/085; C08G 64/18; C08G 77/04; C08G 81/00; C08L 69/00
See application file for complete search history.

(56) References Cited

U.S. PATENT DOCUMENTS 5,451,632 A * 9/1995 Okumura ............. C08G 64/186
524/537
2007/0299174 A1* 12/2007 Chen ....................... C08L 51/04
524/158
(Continued)

FOREIGN PATENT DOCUMENTS

CN 101056942 A 10/2007
CN 102140237 A 8/2011
(Continued)

OTHER PUBLICATIONS

International Search Report and Written Opinion, PCT/JP2016/060274, Idemitsu Kosan Co., Ltd., 6 pages (dated Jun. 14, 2016).
(Continued)

*Primary Examiner* — John E Uselding
(74) *Attorney, Agent, or Firm* — Foley & Lardner LLP

(57) ABSTRACT

Provided is a polycarbonate-based resin composition, including: 10 to 90 mass % of a polycarbonate-polyorganosiloxane copolymer (E-1); and 10 to 90 mass % of an aromatic polycarbonate resin (E-2) except the polycarbonate-polyorganosiloxane copolymer (E-1), in which the molecular weight distribution of the polyorganosiloxane block of the polycarbonate-polyorganosiloxane copolymer is controlled within a specific region.

15 Claims, 1 Drawing Sheet

(51) Int. Cl.
*C08G 64/08* (2006.01)
*C08G 77/04* (2006.01)
*C08G 81/00* (2006.01)
*C08G 77/448* (2006.01)

(52) U.S. Cl.
CPC ............. *C08G 77/04* (2013.01); *C08G 81/00* (2013.01); *C08L 69/00* (2013.01); *C08G 77/448* (2013.01)

(56) References Cited

U.S. PATENT DOCUMENTS

| | | | |
|---|---|---|---|
| 2016/0009919 A1 | 1/2016 | Aoki | |
| 2016/0017102 A1 | 1/2016 | Yamada | |
| 2016/0251481 A1 | 9/2016 | Hwang et al. | |

FOREIGN PATENT DOCUMENTS

| | | | | |
|---|---|---|---|---|
| CN | 103857745 A | 6/2014 | | |
| JP | 08-081620 A | 3/1996 | | |
| JP | 2662310 B2 | 10/1997 | | |
| JP | 2006-523243 A | 10/2006 | | |
| JP | 2011-021127 A | 2/2011 | | |
| JP | 2011-046911 A | 3/2011 | | |
| JP | 2012-153824 A | 8/2012 | | |
| JP | 2012-246430 A | 12/2012 | | |
| JP | 2014-080496 A | 5/2014 | | |
| JP | 2014-172938 A | 9/2014 | | |
| TW | 201323517 A1 | 6/2013 | | |
| TW | 201439200 A | 3/2014 | | |
| WO | WO 2013/051557 A1 | 4/2013 | | |
| WO | WO-2013051557 A1 * | 4/2013 | ............... | C08K 3/22 |
| WO | WO 2015/087595 A1 | 6/2015 | | |

OTHER PUBLICATIONS

CN Office Action issued in corresponding Chinese Application Ser. No. 201680018579.1, dated Jun. 5, 2019.
TW Office Action issued in the corresponding Taiwanese Patent Application Ser. No. 105110142, dated Jun. 25, 2019.
Japanese Office Action issued on Japanese application No. 2017-510067, dated Aug. 13, 2019.
Taiwanese Office Action issued on Taiwanese application No. 105110142, dated Oct. 29, 2019.
Office Action dated Apr. 24, 2020 for corresponding Chinese Patent Application No. 201680018579.1.

* cited by examiner

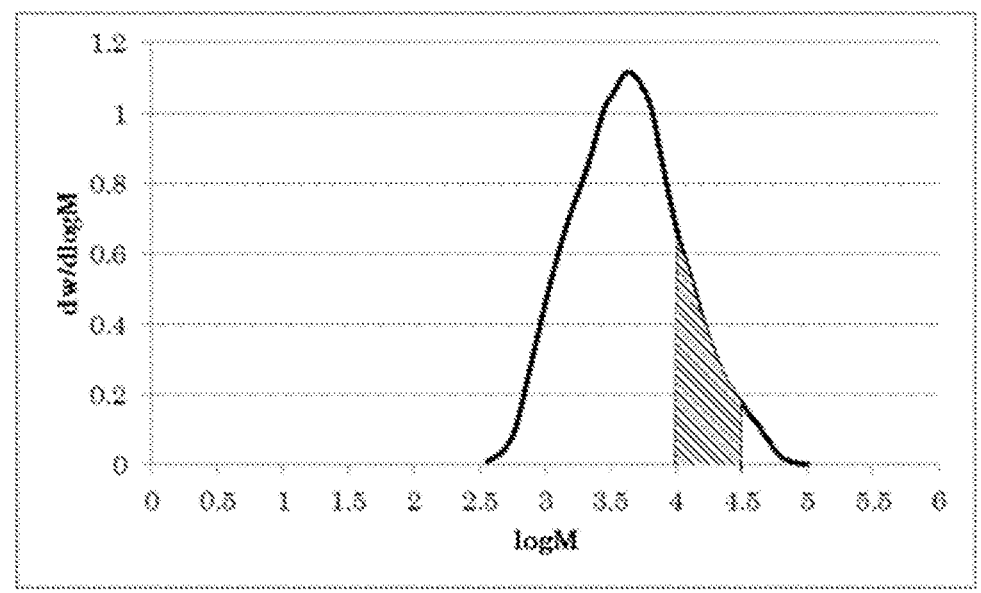

POLYCARBONATE RESIN COMPOSITION AND MOLDED BODY OF SAME

CROSS-REFERENCE TO RELATED APPLICATIONS

This application is a U.S. National Stage Application of PCT/JP2016/060274, filed Mar. 29, 2016, which claims the benefit of and priority to Japanese Patent Application No. 2015-070155, filed Mar. 30, 2015, the entire contents of both of which are incorporated herein by reference.

TECHNICAL FIELD

The present invention relates to a polycarbonate-based resin composition, which is excellent in transparency and has low-temperature impact resistance, and a molded body thereof.

BACKGROUND ART

A polycarbonate resin has been attracting attention because of its excellent properties, such as high impact resistance, chemical resistance, and flame retardancy. Accordingly, the polycarbonate resin has been expected to be widely utilized in various fields, such as the field of electrical and electronic equipment, and the field of automobiles. In particular, the utilization of the polycarbonate resin in casings for a cellular phone, a mobile personal computer, a digital camera, a video camera, an electric tool, and the like, and in other commodities has been expanding. In usual, a homopolycarbonate using 2,2-bis(4-hydroxyphenyl)propane [common name: bisphenol A] as a dihydric phenol serving as a raw material has been generally used as a typical polycarbonate. A polycarbonate-polyorganosiloxane copolymer (hereinafter sometimes referred to as "PC-POS") using a polyorganosiloxane as a copolymerizable monomer has been known for improving the physical properties of the homopolycarbonate, such as flame retardancy and impact resistance (see Patent Documents 1 to 3). When the impact resistance of the polycarbonate-polyorganosiloxane copolymer, in particular, its impact resistance under low temperature is improved, as disclosed in Patent Document 3, a method involving using a polyorganosiloxane having a long chain length has been known. However, the method has involved a problem in that the transparency of the copolymer reduces.

On the other hand, a method involving using a polyorganosiloxane having a relatively short chain length has been known for improving the transparency of the polycarbonate-polyorganosiloxane copolymer (see Patent Documents 4 and 5). However, the method has involved a problem in that the impact resistance of the copolymer reduces.

The following attempt has been made in Patent Document 6. Two kinds of polycarbonate-polyorganosiloxane copolymers having different light transmittances are blended to improve transparency while maintaining excellent impact resistance. However, the transparency cannot be said to be sufficient. As described above, it has been difficult to achieve both excellent transparency and excellent impact resistance, in particular excellent impact resistance under low temperature in a conventional polycarbonate-polyorganosiloxane copolymer.

CITATION LIST

Patent Document

Patent Document 1: JP 2662310 B2
Patent Document 2: JP 2011-21127 A
Patent Document 3: JP 2012-246430 A
Patent Document 4: JP 08-81620 A
Patent Document 5: JP 2011-46911 A
Patent Document 6: JP 2006-523243 A

SUMMARY OF INVENTION

Technical Problem

An object of the present invention is to provide a polycarbonate-based resin composition having excellent transparency and excellent impact resistance, in particular excellent impact resistance under low temperature, and a molded body thereof.

Solution to Problem

The inventors of the present invention have found that the object is achieved by controlling the molecular weight distribution of the polyorganosiloxane block of a polycarbonate-polyorganosiloxane copolymer in a polycarbonate-based resin composition within a specific region.

That is, the present invention relates to the following items 1 to 14.

1. A polycarbonate-based resin composition, comprising:
   10 to 90 mass % of a polycarbonate-polyorganosiloxane copolymer (E-1); and
   10 to 90 mass % of an aromatic polycarbonate resin (E-2) except the polycarbonate-polyorganosiloxane copolymer (E-1), wherein:
   the polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II); and
   in a differential molecular weight distribution curve obtained from measurement of the polyorganosiloxane block (B) by gel permeation chromatography using a polystyrene calibration curve, the curve having an axis of abscissa indicating a logarithmic value log(M) of a molecular weight M and an axis of ordinate indicating dw/dlog(M) obtained by differentiating a concentration fraction w with respect to the logarithmic value log(M) of the molecular weight,
   (1) a dw/dlog(M) value becomes maximum in a range of $3.4 \leq \log(M) \leq 4.0$, and
   (2) a ratio of a value obtained by integrating the dw/dlog (M) value over a range of $4.00 \leq \log(M) \leq 4.50$ to a value obtained by integrating the dw/dlog(M) value over an entire range of the log(M) in the differential molecular weight distribution curve is 6 to 40%:

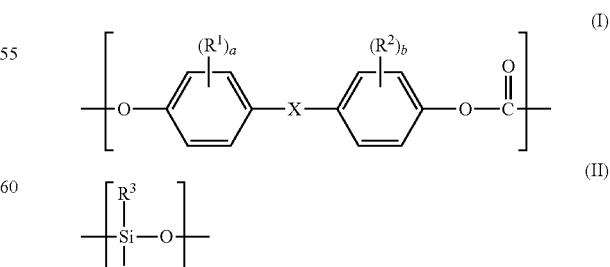

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

2. A polycarbonate-based resin composition, comprising:
   10 to 90 mass % of a polycarbonate-polyorganosiloxane copolymer (E-1); and
   10 to 90 mass % of an aromatic polycarbonate resin (E-2) except the polycarbonate-polyorganosiloxane copolymer (E-1), wherein:
   the polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II); and
   the polycarbonate-based resin composition uses, as a raw material, a polyorganosiloxane having the following features: in a differential molecular weight distribution curve obtained from measurement by gel permeation chromatography using a polystyrene calibration curve, the curve having an axis of abscissa indicating a logarithmic value log(M) of a molecular weight M and an axis of ordinate indicating dw/dlog(M) obtained by differentiating a concentration fraction w with respect to the logarithmic value log (M) of the molecular weight,
   (1) a dw/dlog(M) value becomes maximum in a range of 3.4≤log(M)≤4.0, and
   (2) a ratio of a value obtained by integrating the dw/dlog (M) value over a range of 4.00≤log(M)≤4.50 to a value obtained by integrating the dw/dlog(M) value over an entire range of the log(M) in the differential molecular weight distribution curve is 6 to 40%:

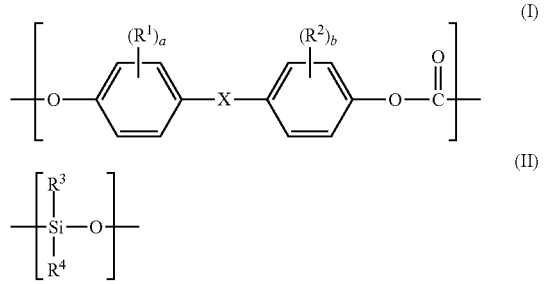

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

3. The polycarbonate-based resin composition according to Item 1 or 2, wherein the aromatic polycarbonate resin (E-2) contains an aromatic homopolycarbonate resin.

4. The polycarbonate-based resin composition according to any one of Items 1 to 3, wherein the aromatic polycarbonate resin (E-2) contains a polycarbonate-polyorganosiloxane copolymer having a polycarbonate block (A') formed of a repeating unit represented by the general formula (I) and a polyorganosiloxane block (B') containing a repeating unit represented by the general formula (II).

5. The polycarbonate-based resin composition according to Item 4, wherein the polyorganosiloxane block (B') has an average chain length of 20 or more and less than 60.

6. The polycarbonate-based resin composition according to Item 4, wherein the polyorganosiloxane block (B') has an average chain length of 60 to 500.

7. The polycarbonate-based resin composition according to any one of Items 1 to 6, wherein the polyorganosiloxane block (B) has an average chain length of 30 to 85.

8. The polycarbonate-based resin composition according to any one of Items 1 to 7, wherein a content of the polyorganosiloxane block (B) in the polycarbonate-polyorganosiloxane copolymer (E-1) is 0.5 to 20.0 mass %.

9. The polycarbonate-based resin composition according to any one of Items 1 to 8, wherein the polycarbonate-polyorganosiloxane copolymer (E-1) has a viscosity-average molecular weight of 12,000 to 40,000.

10. The polycarbonate-based resin composition according to any one of Items 1 to 9, wherein in the general formula (I), a and b each represent 0, and X represents a single bond or an alkylidene group having 2 to 8 carbon atoms.

11. The polycarbonate-based resin composition according to Item 10, wherein in the general formula (I), a and b each represent 0, and X represents an alkylidene group having 3 carbon atoms.

12. The polycarbonate-based resin composition according to any one of Items 1 to 11, wherein in the general formula (II), $R^3$ and $R^4$ each represent a methyl group.

13. A molded body, which is obtained by molding the polycarbonate-based resin composition of any one of Items 1 to 12.

14. The molded body according to Item 13, wherein the molded body comprises a part for electrical and electronic equipment.

Advantageous Effects of Invention

According to the present invention, the polycarbonate-based resin composition having excellent transparency and excellent impact resistance, in particular excellent impact resistance under low temperature, and the molded body thereof can be obtained.

BRIEF DESCRIPTION OF DRAWINGS

The FIGURE is a graph for showing an example of a differential molecular weight distribution curve to be obtained, the FIGURE being for showing a value obtained by integrating dw/dlog(M) over the range of 4.00≤log(M)≤4.50 in a shaded area.

DESCRIPTION OF EMBODIMENTS

A polycarbonate-based resin composition of the present invention is described in detail below. In this description, a specification considered to be preferred can be arbitrarily adopted, and a combination of preferred specifications can be said to be more preferred. The term "XX to YY" as used herein means "from XX or more to YY or less".

A polycarbonate-based resin composition of the present invention comprises:

10 to 90 mass % of a polycarbonate-polyorganosiloxane copolymer (E-1); and 10 to 90 mass % of an aromatic polycarbonate resin (E-2) except the polycarbonate-polyorganosiloxane copolymer (E-1), wherein:

the polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II); and in a differential molecular weight distribution curve obtained from measurement of the polyorganosiloxane block (B) by gel permeation chromatography using a polystyrene calibration curve, the curve having an axis of abscissa indicating a logarithmic value log(M) of a molecular weight M and an axis of ordinate indicating dw/dlog(M) obtained by differentiating a concentration fraction w with respect to the logarithmic value log(M) of the molecular weight, (1) a dw/dlog(M) value becomes maximum in a range of $3.4 \leq \log(M) \leq 4.0$, and (2) a ratio of a value obtained by integrating the dw/dlog (M) value over a range of $4.00 \leq \log(M) \leq 4.50$ to a value obtained by integrating the dw/dlog (M) value over an entire range of the log (M) in the differential molecular weight distribution curve is 6 to 40%:

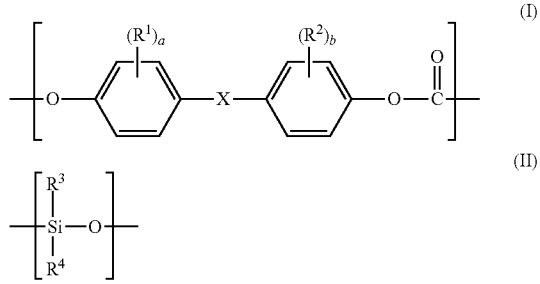

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

[Polycarbonate-Based Resin]

A polycarbonate-based resin containing the polycarbonate-polyorganosiloxane copolymer (E-1) is used in the polycarbonate-based resin composition of the present invention. The polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II).

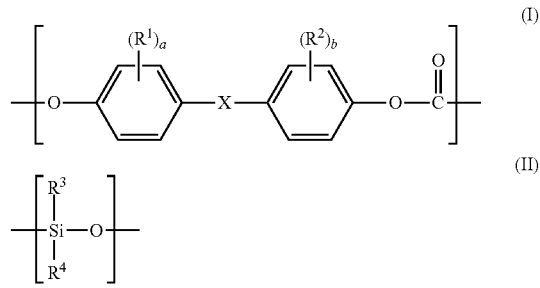

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms. As an aryl moiety of the arylalkylene group represented by X, there are given, for example, aryl groups each having 6 to 14 ring-forming carbons, such as a phenyl group, a naphthyl group, a biphenyl group, and an anthryl group. As an aryl moiety of the arylalkylidene group represented by X, there are given, for example, aryl groups each having 6 to 14 ring-forming carbons, such as a phenyl group, a naphthyl group, a biphenyl group, and an anthryl group.

a and b each independently represent an integer of 0 to 4, preferably 0 to 2, more preferably 0 or 1.

Among them, the following is suitable: a repeating unit in which a and b each represent 0, and X represents a single bond or an alkylidene group having 2 to 8 carbon atoms, or a repeating unit in which a and b each represent 0, and X represents an alkylidene group having 3 carbon atoms, particularly an isopropylidene group.

Examples of the halogen atom represented by $R^3$ or $R^4$ in the general formula (II) include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. An example of the alkoxy group represented by $R^3$ or $R^4$ is an alkoxy group whose alkyl group moiety is the alkyl group described above. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The content of the polyorganosiloxane block (B) containing a repeating unit represented by the general formula (II) in the PC-POS copolymer (E-1) to be used in the present invention is preferably 0.5 to 20.0 mass %, more preferably 1.5 to 15.0 mass %. When the content of the polyorganosiloxane block (B) is 0.5 mass % or more, sufficient low-temperature impact resistance is obtained, and when the content is 20.0 mass % or less, sufficient heat resistance is obtained.

The polyorganosiloxane block (B) containing a repeating unit represented by the general formula (II) in the PC-POS copolymer (E-1) to be used in the present invention is preferably represented by any one of the following general formulae (II-I) to (II-III):

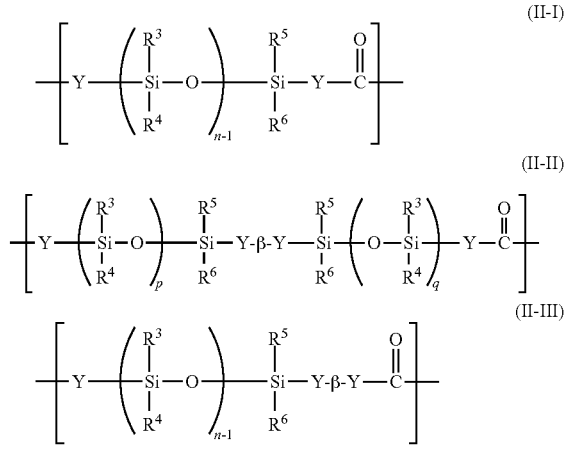

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O— or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, p and q each represent an integer of 1 or more, and the sum of p and q is n−2, and n represents an average chain length of the polyorganosiloxane.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7$—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The average chain length n of the polyorganosiloxane block (B) in the PC-POS copolymer (E-1) to be used in the present invention is preferably 30 to 85, more preferably 40 to 75, still more preferably 58 to 72. The average chain length n is calculated by nuclear magnetic resonance (NMR) measurement. When the average chain length n is 30 or more, a resin composition and a molded body each having sufficient impact resistance at low temperature can be obtained. When the average chain length n is 85 or less, a resin composition and a molded body each of which is excellent appearance of molded product can be obtained.

The polyorganosiloxane block (B) containing a repeating unit represented by the general formula (II) for forming the PC-POS copolymer (E-1) to be used in the present invention satisfies the following (1) and (2) in a differential molecular weight distribution curve obtained from measurement of the polyorganosiloxane block (B) by gel permeation chromatography using a polystyrene calibration curve, the curve having an axis of abscissa indicating a logarithmic value log (M) of a molecular weight M and an axis of ordinate indicating dw/dlog(M) obtained by differentiating a concentration fraction w with respect to the logarithmic value log(M) of the molecular weight:

(1) a dw/dlog(M) value becomes maximum in a range of 3.4≤log(M)≤4.0; and (2) a ratio of a value obtained by integrating the dw/dlog (M) value over a range of 4.00≤log(M)≤4.50 to a value obtained by integrating the dw/dlog (M) value over an entire range of the log (M) in the differential molecular weight distribution curve is 6 to 40%.

<Polyorganosiloxane>

The polyorganosiloxane to be used in the present invention is a polyorganosiloxane having a feature in that in a differential molecular weight distribution curve obtained from measurement by gel permeation chromatography using a polystyrene calibration curve, the curve having an axis of abscissa indicating a logarithmic value log(M) of a molecular weight M and an axis of ordinate indicating dw/dlog(M)

obtained by differentiating a concentration fraction w with respect to the logarithmic value log(M) of the molecular weight, (1) a dw/dlog(M) value becomes maximum in a range of 3.4≤log(M)≤4.0, and (2) a ratio of a value obtained by integrating the dw/dlog (M) value over a range of 4.00≤log(M)≤4.50 to a value obtained by integrating the dw/dlog(M) value over an entire range of the log(M) in the differential molecular weight distribution curve is 6 to 40%.

In order that the polyorganosiloxane block (B) for forming the polycarbonate-polyorganosiloxane copolymer (E-1) to be used in the present invention may have the above feature, a polyorganosiloxane represented by the following general formula (2), the following general formula (3), and/or the following general formula (4) can be used as a raw material:

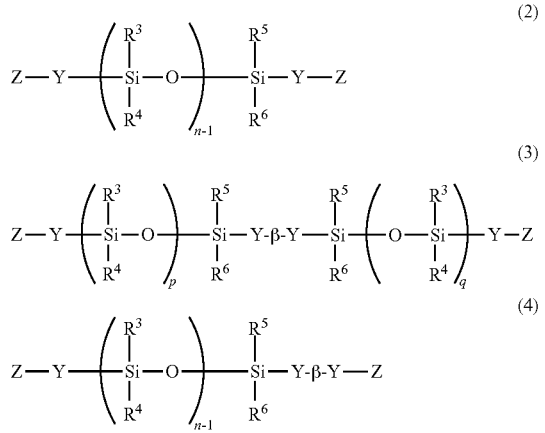

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and the sum of p and q is n−2, and n represents an average chain length of the polyorganosiloxane.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxane represented by the general formula (2), the general formula (3), and/or the general formula (4) is preferably a polyorganosiloxane in which $R^3$ to $R^6$ each represent a methyl group.

The linear or branched alkylene group represented by $R^7$ in —$R^7$O—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (5) or (6), provided that when the block has the aryl-substituted alkylene group, the alkylene group is bonded to Si:

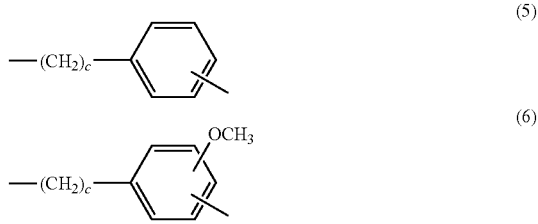

wherein c represents a positive integer and typically represents an integer of 1 to 6.

The diarylene group represented by any one of $R^7$, $R^9$, and $R^{10}$ is a group in which two arylene groups are linked to each other directly or through a divalent organic group, and is specifically a group having a structure represented by —Ar$^1$—W—Ar$^2$—. Here, Ar$^1$ and Ar$^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, Ar$^1$ and Ar$^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —R⁷O—. R⁷ preferably represents an aryl-substituted alkylene group, in particular a residue of a phenol-based compound having an alkyl group, and more preferably represents an organic residue derived from allylphenol or an organic residue derived from eugenol.

With regard to p and q in the general formula (3), it is preferred that p=q, i.e., p=(n−2)/2 and q=(n−2)/2.

As described above, n represents preferably 30 to 85, more preferably 40 to 75, still more preferably 58 to 72.

β represents a divalent group derived from a diisocyanate compound, or a divalent group derived from a dicarboxylic acid or a halide of a dicarboxylic acid, and examples thereof include divalent groups represented by the following general formulae (7-1) to (7-5).

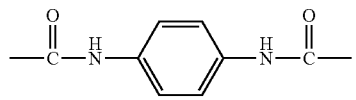
(7-1)

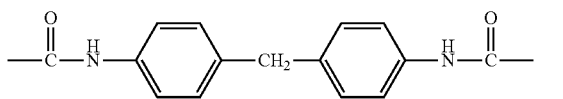
(7-2)

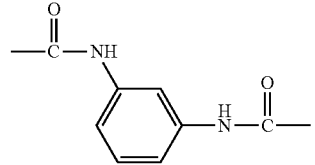
(7-3)

(7-4)

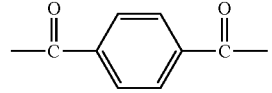
(7-5)

Examples of the polyorganosiloxane represented by the general formula (2) include compounds represented by the following general formulae (2-1) to (2-11):

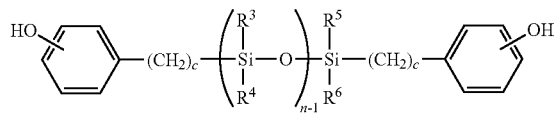
(2-1)

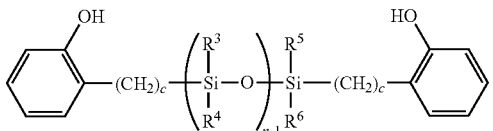
(2-2)

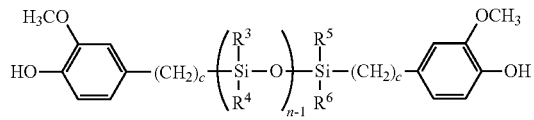
(2-3)

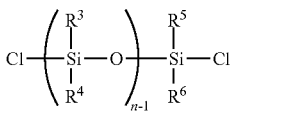
(2-4)

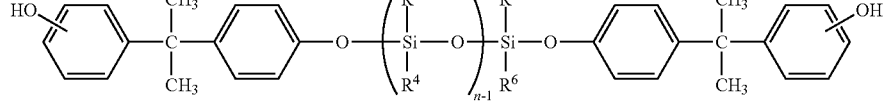
(2-5)

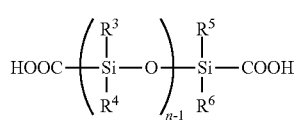
(2-6)

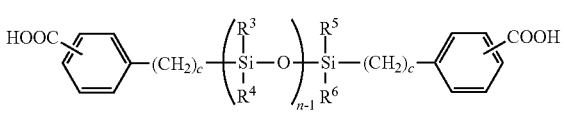
(2-7)

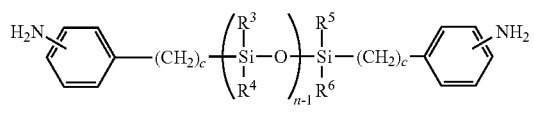
(2-8)

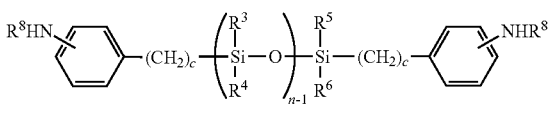
(2-9)

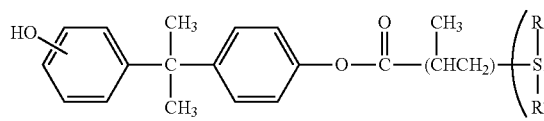
(2-10)

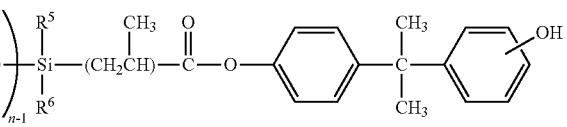

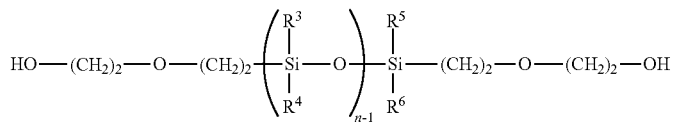

(2-11)

In the general formulae (2-1) to (2-11), $R^3$ to $R^6$, n, and $R^8$ are as defined above, and preferred examples thereof are also the same as those described above, and c represents a positive integer and typically represents an integer of 1 to 6.

Among them, a phenol-modified polyorganosiloxane represented by the general formula (2-1) is preferred from the viewpoint of its ease of polymerization. In addition, an α,ω-bis[3-(o-hydroxyphenyl)propyl]polydimethylsiloxane, which is one of compound represented by the general formula (2-2), or an α,ω-bis[3-(4-hydroxy-3-methoxyphenyl)propyl]polydimethylsiloxane, which is one of compound represented by the general formula (2-3), is preferred from the viewpoint of its ease of availability.

In addition to the polyorganosiloxane shown above, polyorganosiloxane compounds disclosed in the following Documents may also be suitably used: JP 2013-523938 A, JP 04-225059 A, JP 2006-518803 A, WO 2013/115604 A1, and the like.

The average chain length n of the polyorganosiloxane represented by the general formula is preferably 30 to 85, more preferably 40 to 75, still more preferably 58 to 72. The average chain length n is calculated by nuclear magnetic resonance (NMR) measurement. When the average chain length n is 30 or more, the impact resistance at low temperature is sufficiently obtained. When the average chain length n is 85 or less, a copolymer excellent in molding external appearance can be obtained.

A gel permeation chromatographic (GPC) apparatus for obtaining the measured values of the molecular weight and molecular weight distribution of the polyorganosiloxane is not particularly limited, and a GPC apparatus that is generally on the market, such as a GPC measuring machine with an internal refractive index (RI) detector "HLC-8200" manufactured by Tosoh Corporation, can be utilized. In particular, a product obtained by coupling "TSK-GEL G4000HXL" and "TSK-GEL G2000HXL" manufactured by Tosoh Corporation is used as a GPC column. A column temperature is set to 40° C., tetrahydrofuran (THF) is used as an eluent, and measurement is performed at a flow rate of 1.0 ml/min. Standard polystyrene manufactured by Tosoh Corporation is used to obtain a calibration curve. The logarithmic value of a molecular weight thus obtained is referred to as "logarithmic molecular weight (log(M))."

In the time curve of an intensity distribution detected with the refractive index (RI) detector of the GPC apparatus (generally referred to as "elution curve"), an elution time is converted into a molecular weight by using the calibration curve obtained from the substance having a known molecular weight. Here, the intensity detected with the RI is in proportion to a component concentration, and hence a concentration fraction at each elution time is determined by determining an intensity area when the total area of the elution curve is set to 100%. An integral molecular weight distribution curve can be obtained by sequentially integrating the concentration fraction, and plotting the logarithmic value of the molecular weight (log(M)) along an axis of abscissa and the integrated value of the concentration fraction (w) along an axis of ordinate.

Subsequently, a differential molecular weight distribution curve can be obtained by determining the differential value of the curve at each logarithmic value of the molecular weight (i.e., the gradient of the integral molecular weight distribution curve), and plotting the logarithmic value of the molecular weight (log(M)) along an axis of abscissa and the differential value (dw/dlog(M)) along an axis of ordinate. Therefore, a differential molecular weight distribution means a value obtained by differentiating the concentration fraction (w) with respect to the logarithmic value of the molecular weight (log(M)), i.e., "dw/dlog(M)." The differential molecular weight distribution dw/dlog (M) at a specific log(M) can be read from the differential molecular weight distribution curve. It should be noted that in the case of a polyorganosiloxane blend obtained by blending a plurality of polyorganosiloxanes as well, a differential molecular weight distribution curve can be obtained by the same approach after the measurement of the polyorganosiloxane blend by a GPC method.

In the present invention, (1) the dw/dlog(M) value becomes maximum in the range of $3.4 \le \log(M) \le 4.0$, preferably in the range of $3.5 \le \log(M) \le 3.8$. The maximum value of the differential molecular weight distribution dw/dlog(M) refers to a peak top in the differential molecular weight distribution curve. When the value for the log (M) of the peak top in the differential molecular weight distribution curve is 3.4 or more, sufficient low-temperature impact resistance is obtained, and when the value is 4.0 or less, satisfactory transparency is obtained.

In addition, in the present invention, (2) the ratio of a value obtained by integrating the dw/dlog(M) value over the range of $4.00 \le \log (M) \le 50$ to a value obtained by integrating the dw/dlog (M) value over the entire range of the log (M) in the differential molecular weight distribution curve is 6 to 40%, preferably 6.5 to 30%. When the ratio is 6% or more, sufficient low-temperature impact resistance is obtained. When the ratio is 40% or less, satisfactory transparency is obtained. Here, the ratio of the value obtained by integrating the dw/dlog(M) value over the range of $4.00 \le \log (M) \le 50$ to the value obtained by integrating the dw/dlog(M) value over the entire range of the log(M) refers to the ratio at which a component having a log(M) of 4.00 to 4.50 is present with respect to the entirety of the POS in the molecular weight distribution of the POS.

A method of producing the polyorganosiloxane is not particularly limited. According to, for example, a method described in JP 11-217390 A, a crude polyorganosiloxane can be obtained by: causing cyclotrisiloxane and disiloxane to react with each other in the presence of an acid catalyst to synthesize α,ω-dihydrogen organopentasiloxane; and then subjecting a phenolic compound (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. In addition, according to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting a phenolic compound or the like to an addition reaction with the resultant α,ω-dihydrogen organopolysiloxane in the presence of the catalyst for a hydrosilylation reaction in the same manner as described above. The chain length n of the α,ω-dihydrogen organopolysiloxane can be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

An adsorbent is preferably caused to adsorb and remove a transition metal derived from a transition metal-based catalyst used as the catalyst for a hydrosilylation reaction in the crude polyorganosiloxane by bringing the crude polyorganosiloxane into contact with the adsorbent.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, yet still more preferably 100 Å or less. In addition, from the same viewpoint, the adsorbent is preferably a porous adsorbent.

The adsorbent is not particularly limited as long as the adsorbent has the above-mentioned average pore diameter. For example, there may be used activated clay, acidic clay, activated carbon, synthetic zeolite, natural zeolite, activated alumina, silica, a silica-magnesia-based adsorbent, diatomaceous earth, and cellulose. Among them, preferred is at least one selected from the group consisting of activated clay, acidic clay, activated carbon, synthetic zeolite, natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically 1 μm to 4 mm, preferably 1 μm to 100 μm from the viewpoint of separating the adsorbent from the polyorganosiloxane after the adsorption of the transition metal.

When the adsorbent is used, its usage amount is not particularly limited. A porous adsorbent can be used in an amount in the range of preferably 1 to 30 parts by mass, more preferably 2 to 20 parts by mass with respect to 100 parts by mass of the crude polyorganosiloxane.

When the crude polyorganosiloxane to be treated has so high a molecular weight that the crude polyorganosiloxane is not in a liquid state, the polyorganosiloxane may be heated to such a temperature as to be in a liquid state upon performance of the adsorption with the adsorbent and the separation of the adsorbent. Alternatively, the adsorption and the separation may be performed under a state in which the polyorganosiloxane is dissolved in a solvent, such as methylene chloride or hexane.

A polyorganosiloxane having a desired molecular weight distribution is obtained by regulating its molecular weight distribution through, for example, the blending of a plurality of polyorganosiloxanes. With regard to the blending, a crude polyorganosiloxane having a desired molecular weight distribution can be obtained by blending a plurality of α,ω-dihydrogen organopolysiloxanes and then subjecting a phenol compound or the like to an addition reaction with the resultant in the presence of a catalyst for a hydrosilylation reaction. In addition, purification, such as the removal of the catalyst for a hydrosilylation reaction, may be performed after a plurality of crude polyorganosiloxanes have been blended. A plurality of polyorganosiloxanes after the purification may be blended. In addition, a molecular weight distribution can be appropriately adjusted depending on a polymerization condition at the time of the production of a polyorganosiloxane. In addition, a desired molecular weight distribution can be obtained by fractionating only part of existing polyorganosiloxanes through means such as various kinds of separation.

<Method of Producing PC-POS Copolymer (E-1)>

A known production method, such as an interfacial polymerization method (phosgene method), a pyridine method, or an ester exchange method, can be employed as a method of producing the PC-POS copolymer (E-1) to be used in the present invention. Particularly in the case of the interfacial polymerization method, the step of separating an organic phase containing the PC-POS copolymer (E-1) and an aqueous phase containing an unreacted substance, a catalyst residue, or the like becomes easy, and hence the separation of the organic phase containing the PC-POS copolymer (E-1) and the aqueous phase in each washing step based on alkali washing, acid washing, or pure water washing becomes easy. Accordingly, the PC-POS copolymer (E-1) is efficiently obtained.

The method of producing the PC-POS copolymer (E-1) is not particularly limited and the copolymer can be produced with reference to a known method of producing a PC-POS copolymer, such as a method described in JP 2010-241943 A.

Specifically, the PC-POS copolymer (E-1) can be produced by: dissolving a polycarbonate oligomer produced in advance and the polyorganosiloxane in a water-insoluble organic solvent (such as methylene chloride); adding an alkaline aqueous solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol, such as p-t-butylphenol). In addition, the PC-POS copolymer (E-1) can be produced by copolymerizing a polyorganosiloxane, a dihydric phenol, and phosgene, a carbonate, or a chloroformate.

In the present invention, as described above, a polyorganosiloxane having the following features is used as a raw material: when an axis of ordinate and an axis of abscissa in a differential molecular weight distribution curve obtained from the results of measurement by the GPC method using the polystyrene calibration curve indicate dw/dlog (M) and log (M), where w represents a concentration fraction and M represents a molecular weight, respectively, (1) a dw/dlog (M) value becomes maximum in the range of $3.4 \leq \log(M)$ ≤4.0, and (2) the ratio of a value obtained by integrating the dw/dlog (M) value over the range of 4.00≤log (M)≤4.50 to a value obtained by integrating the dw/dlog (M) value over the entire range of the log(M) in the differential molecular weight distribution curve is 6 to 40%. Specifically, a polyorganosiloxane represented by the general formula (2), the general formula (3), and/or the general formula (4) is used.

The polycarbonate oligomer can be produced through a reaction of a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer can also be produced through a reaction of a dihydric phenol and a carbonate precursor, such as diphenyl carbonate.

A dihydric phenol represented by the following general formula (i) is preferably used as the dihydric phenol:

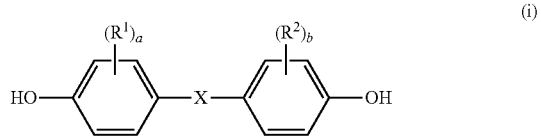

(i)

wherein $R^1$, $R^2$, a, b, and X are as described above.

Examples of the dihydric phenol represented by the general formula (i) include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. Those dihydric phenols may be used alone or as a mixture thereof.

Examples of the bis(hydroxyaryl)alkane include bis(4-hydroxyphenyl)methane, 1,1-bis(4-hydroxyphenyl)ethane, 2,2-bis(4-hydroxyphenyl)propane [bisphenol A], 2,2-bis(4-hydroxyphenyl)butane, 2,2-bis(4-hydroxyphenyl)octane, bis(4-hydroxyphenyl)phenylmethane, bis(4-hydroxyphenyl) diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl) propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornene, and 1,1-bis(4-hydroxyphenyl)cyclododecane. Examples of the dihydroxyaryl ether include 4,4'-dihydroxydiphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl) fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the abovementioned dihydric phenols include 4,4'-[1,3-phenylenebis (1-methylethylidene)]bisphenol, 10,10-bis(4-hydroxyphenyl)-9-anthrone, and 1,5-bis(4-hydroxyphenylthio)-2,3-dioxapentane.

The dihydric phenols may be used alone or as a mixture thereof.

Among them, bis(hydroxyphenyl)alkane-based dihydric phenols are preferred, and bisphenol A is more preferred. When bisphenol A is used as the dihydric phenol, X represents an isopropylidene group and a relationship of a=b=0 is satisfied in the general formula (i).

In order to control the molecular weight of the PC-POS copolymer to be obtained, a terminal stopper can be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the liquid is appropriately left at rest to be separated into an aqueous phase and an organic solvent phase [separating step], the organic solvent phase is washed (preferably washed with a basic aqueous solution, an acidic aqueous solution, and water in the stated order) [washing step], and the resultant organic phase is concentrated [concentrating step], and dried [drying step]. Thus, the PC-POS copolymer can be obtained.

The PC-POS copolymer (E-1) to be used in the present invention can be produced by appropriately using, for example, a molecular weight modifier so that its viscosity-average molecular weight may be a molecular weight intended for an application or product in which the copolymer is used. The copolymer is produced so as to have a viscosity-average molecular weight in the range of typically 12,000 to 40,000, preferably about 15,000 to about 30,000. When the viscosity-average molecular weight is 12,000 or more, the strength of a molded body is sufficient. When the viscosity-average molecular weight is 40,000 or less, injection molding or extrusion molding can be performed in a proper temperature region, and hence satisfactory transparency is obtained.

In addition, the viscosity of the PC-POS copolymer (E-1) can be reduced by increasing its molding temperature. In that case, however, its molding cycle lengthens to result in poor economical efficiency. Moreover, when the temperature is excessively increased, the transparency tends to reduce owing to the heat deterioration of the PC-POS copolymer (E-1).

The viscosity-average molecular weight (Mv) is a value calculated from Schnell's equation ($[\eta]=1.23\times10^{-5}\times Mv^{0.83}$) by measuring the limiting viscosity [η] of a methylene chloride solution at 20° C.

The blending amount of the polycarbonate-polyorganosiloxane copolymer (E-1) in the polycarbonate-based resin composition of the present invention is 10 to 90 mass %, preferably 15 to 85 mass %, more preferably 20 to 80 mass %.

[Aromatic Polycarbonate Resin (E-2)]

The polycarbonate-based resin to be used in the polycarbonate-based resin composition of the present invention contains the aromatic polycarbonate resin (E-2) except the polycarbonate-polyorganosiloxane copolymer (E-1).

A first aspect of the aromatic polycarbonate resin (E-2) is, for example, an aromatic polycarbonate resin (E-2a) containing a polycarbonate block (A') formed of a repeating unit represented by the general formula (I) and a polyorganosiloxane block (B') containing a repeating unit represented by the following general formula (II), in which the polyorganosiloxane block (B') containing a repeating unit represented by the general formula (II) is represented by, for example, any one of the following general formulae (ii-I) to (ii-III), and has an average chain length of 20 or more to less than 60. The average chain length of the aromatic polycarbonate resin (E-2a) is preferably 30 to 50, more preferably 30 to 45. The general formula (I) in the polycarbonate block (A') and a preferred one thereof, and the general formula (II) in the polyorganosiloxane block (B') and a preferred one thereof are identical to those of the (E-1).

A second aspect of the aromatic polycarbonate resin (E-2) is, for example, an aromatic polycarbonate resin (E-2b) containing the polycarbonate block (A') formed of a repeating unit represented by the general formula (I) and the polyorganosiloxane block (B') containing a repeating unit represented by the following general formula (II), in which the polyorganosiloxane block (B') containing a repeating unit represented by the general formula (II) is represented by, for example, any one of the following general formulae (ii-I) to (ii-III), and has an average chain length of 60 to 500. The average chain length of the aromatic polycarbonate resin (E-2b) is preferably 70 to 200, more preferably 80 to 150. The general formula (I) in the polycarbonate block (A') and a preferred one thereof, and the general formula (II) in the polyorganosiloxane block (B') and a preferred one thereof are identical to those of the (E-1).

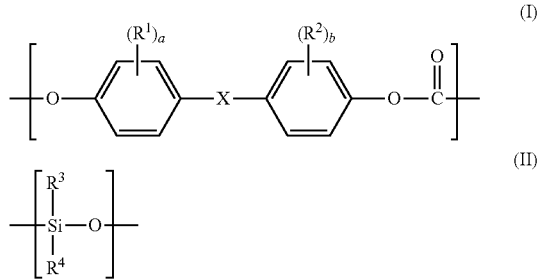

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

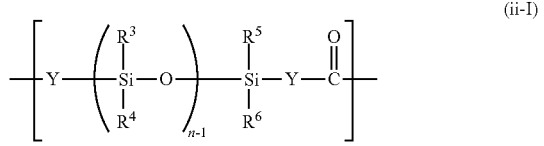

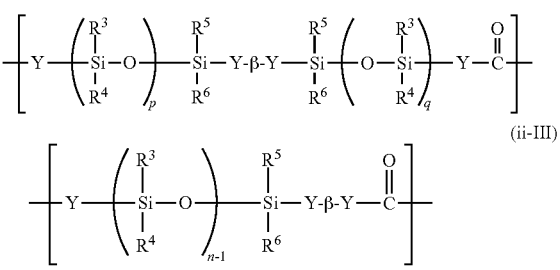

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$'s may be identical to or different from each other, Y represents —R$^7$O—, —R$^7$COO—, —R$^7$NH—, —R$^7$NR$^8$—, —COO—, —S—, —R$^7$COO—R$^9$—O—, or —R$^7$O—R$^{10}$—O—, and a plurality of Y's may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, p and q each represent an integer of 1 or more, and the sum of p and q is n–2, and n represents an average chain length of the polyorganosiloxane.

Preferred modes of the $R^3$ to the $R^{16}$ are identical to those described above. In addition, production methods for the aromatic polycarbonate resins (E-2a) and (E-2b) are also identical to that for the (E-1), provided that the polyorganosiloxane block (B') in each of the (E-2a) and the (E-2b) does not satisfy a requirement concerning the predetermined molecular weight distribution of the polyorganosiloxane block (B) in the PC-POS copolymer (E-1).

A third aspect of the aromatic polycarbonate resin (E-2) is, for example, an aromatic homopolycarbonate resin. The third aspect is specifically, for example, an aromatic polycarbonate resin (E-2c) that is free of a repeating structure represented by the general formula (II) and has a repeating unit represented by the following general formula (III) in its main chain. The aromatic polycarbonate resin (E-2c) is not particularly limited, and various known polycarbonate resins can each be used.

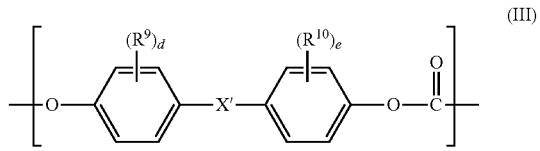

wherein $R^9$ and $R^{19}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of 0 to 4.

Specific examples of R$^9$ and R$^{19}$ in the formula (III) include the same examples as those of the R$^1$ and the R$^2$, and preferred examples thereof are also the same as those of the R$^1$ and the R$^2$. R$^9$ and R$^{19}$ each more preferably represent an alkyl group having 1 to 6 carbon atoms or an alkoxy group having 1 to 6 carbon atoms. Specific examples of X' include the same examples as those of the X, and preferred examples thereof are also the same as those of the X. d and e each independently represent preferably 0 to 2, more preferably 0 or 1.

A resin obtained by a conventional polycarbonate production method can be used as the aromatic polycarbonate resin (E-2c), and specific examples thereof include: an interfacial polymerization method involving causing a dihydric phenol-based compound and phosgene to react with each other in the presence of an organic solvent inert to a reaction and an alkali aqueous solution, and then adding a polymerization catalyst, such as a tertiary amine or a quaternary ammonium salt, to polymerize the resultant; and a pyridine method involving dissolving the dihydric phenol-based compound in pyridine or a mixed solution of pyridine and the inert solvent, and introducing phosgene to directly produce the resin.

At the time of the reaction, a molecular weight modifier (terminal stopper), a branching agent, or the like is used as required.

The dihydric phenol-based compound is, for example, a compound represented by the following general formula (III'):

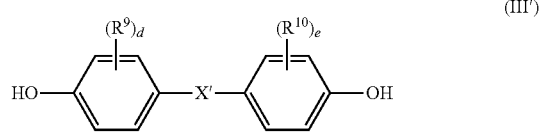

wherein R$^9$, R$^{10}$, X', d, and e are as defined above, and preferred examples thereof are also the same as those described above.

Specific examples of the dihydric phenol-based compound include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl) cycloalkanes; bis(4-hydroxyphenyl)oxide; bis(4-hydroxyphenyl)sulfide; bis(4-hydroxyphenyl)sulfone; bis(4-hydroxyphenyl)sulfoxide; and bis(4-hydroxyphenyl) ketone.

Among them, bis(hydroxyphenyl)alkane-based dihydric phenols are preferred, and bisphenol A is more preferred.

The aromatic polycarbonate resins (E-2) may be used alone or in combination thereof.

The blending amount of the aromatic polycarbonate resin (E-2) in the polycarbonate-based resin composition of the present invention is 10 to 90 mass %, preferably 15 to 85 mass %, more preferably 20 to 80 mass %.

The content of the polyorganosiloxane block containing a repeating unit represented by the general formula (II) in the PC-POS copolymer (E-1) and the aromatic polycarbonate resin (E-2) (the (E-1) and the (E-2) are hereinafter sometimes collectively referred to as "polycarbonate-based resin") is preferably 0.5 to 20.0 mass %, more preferably 1.5 to 15.0 mass %. When the content of the polyorganosiloxane block is 0.5 mass % or more, sufficient low-temperature impact resistance is obtained, and when the content is 20.0 mass % or less, sufficient heat resistance is obtained.

The viscosity-average molecular weight of the polycarbonate-based resin is preferably 12,000 to 40,000, more preferably 15,000 to 30,000. When the viscosity-average molecular weight is 12,000 or more, the strength of a molded body is sufficient. When the viscosity-average molecular weight is 40,000 or less, injection molding or extrusion molding can be performed in a proper temperature region, and hence satisfactory transparency is obtained.

[Other Additives]

Other additives may be incorporated into the polycarbonate-based resin composition of the present invention to the extent that the effects of the present invention are not impaired. Examples of the other additives may include an antioxidant, a UV absorber, a flame retardant, a release agent, and a dye. Among them, an antioxidant is preferably incorporated into the polycarbonate-based resin composition of the present invention. The incorporation of the antioxidant into the polycarbonate-based resin composition can prevent the oxidative deterioration of the polycarbonate-based resin composition at the time of its melting, and hence can prevent its coloring or the like due to the oxidative deterioration. For example, a phosphorus-based antioxidant and/or a phenol-based antioxidant is suitably used as the antioxidant.

Examples of the phosphorus-based antioxidant include triphenyl phosphite, diphenylnonyl phosphite, diphenyl(2-ethylhexyl) phosphite, tris(2,4-di-t-butylphenyl) phosphite, trisnonylphenyl phosphite, diphenylisooctyl phosphite, 2,2'-methylenebis(4,6-di-t-butylphenyl)octyl phosphite, diphenylisodecyl phosphite, diphenyl mono(tridecyl) phosphite, phenyl diisodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-t-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-t-butylphenyl)ditridecyl phosphite, bis(2,4-di-t-butylphenyl)pentaerythritol diphosphite, bis(2,6-di-t-butyl-4-methylphenyl)pentaerythritol diphosphite, bis(nonylphenyl)pentaerythritol diphosphite, distearylpentaerythritol diphosphite, phenyl bisphenol A pentaerythritol diphosphite, tetraphenyl dipropylene glycol diphosphite, 1,1,3-tris(2-methyl-4-di-tridecyl phosphite-5-t-butylphenyl)butane, 3,4,5,6-dibenzo-1,2-oxaphosphane, triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl-(hydroxymethyl)-phosphine, diphenyl-(acetoxymethyl)-phosphine, diphenyl-(R-phosphine, tris-(p-chlorophenyl)phosphine, tris-(p-fluorophenyl)phosphine, diphenylbenzylphosphine, diphenyl-β-cyanoethylphosphine, diphenyl-(p-hydroxyphenyl)-phosphine, diphenyl-1,4-dihydroxyphenyl-2-phosphine, and phenylnaphthylbenzylphosphine.

In addition, examples of the phosphorus-based antioxidant may include commercially available products, such as Irgafos 168 (manufactured by BASF Japan, trademark), Irgafos 12 (manufactured by BASF Japan, trademark), Irgafos 38 (manufactured by BASF Japan, trademark), ADK STAB 2112 (manufactured by ADEKA Corporation, trademark), ADK STAB C (manufactured by ADEKA Corporation, trademark), ADK STAB 329K (manufactured by ADEKA Corporation, trademark), ADK STAB PEP36 (manufactured by ADEKA Corporation, trademark), JC-263 (manufactured by Johoku Chemical Co., Ltd., trademark), Sandstab P-EPQ (manufactured by Clariant, trademark), Weston 618 (manufactured by GE, trademark), Weston 619G (manufactured by GE, trademark), and Weston 624 (manufactured by GE, trademark).

Examples of the phenol-based antioxidant include hindered phenols, such as n-octadecyl-3-(3,5-di-t-butyl-4-hydroxyphenyl)propionate, 2,6-di-t-butyl-4-methylphenol, 2,2'-methylenebis(4-methyl-6-t-butylphenol), and pentaerythrityl-tetrakis[3-(3,5-di-t-butyl-4-hydroxyphenyl)propionate].

Among those antioxidants, antioxidants each having a pentaerythritol diphosphite structure, such as bis(2,6-di-tert-butyl-4-methylphenyl)pentaerythritol diphosphite and bis(2,4-di-tert-butylphenyl)pentaerythritol diphosphite, and triphenylphosphine are preferred.

Examples of the phenol-based antioxidant may include commercially available products, such as Irganox 1010 (manufactured by BASF Japan, trademark), Irganox 1076 (manufactured by BASF Japan, trademark), Irganox 1330 (manufactured by BASF Japan, trademark), Irganox 3114 (manufactured by BASF Japan, trademark), Irganox 3125 (manufactured by BASF Japan, trademark), BHT (manufactured by Takeda Pharmaceutical Company, trademark), Cyanox 1790 (manufactured by American Cyanamid Company, trademark), and Sumilizer GA-80 (manufactured by Sumitomo Chemical Co., Ltd., trademark).

The content of the antioxidant is about 0.001 to about 0.5 parts by mass, preferably 0.01 to 0.3 parts by mass, more preferably 0.05 to 0.3 parts by mass with respect to 100 parts by mass of the total amount of the (E-1) and the (E-2). When the content of the antioxidant is 0.001 part by mass or more, a sufficient antioxidant effect is obtained, and when the content is 0.5 parts by mass or less, the contamination of a die to be used at the time of the molding of the composition can be sufficiently suppressed.

The polycarbonate-based resin composition of the present invention is obtained by: blending the above respective components at the above-mentioned ratios and various optional components to be used as required at appropriate ratios; and kneading the components.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of 240 to 320° C. An extruder, in particular a vented extruder is preferably used as the melt-kneading molding machine.

[Molded Body]

Various molded bodies can be produced from the polycarbonate-based resin composition of the present invention through molding with the melt-kneading molding machine, or by using a pellet obtained from the composition as a raw material through molding by an injection molding method, an injection compression molding method, an extrusion molding method, a blow molding method, a press molding method, a vacuum molding method, a foam molding method, and the like. In particular, the resultant pellet can be suitably used in the production of injection-molded bodies by injection molding and injection compression molding.

The molded body comprising the polycarbonate-based resin composition of the present invention can be suitably used as, for example, (1) a part for electrical and electronic equipment, such as a television, a radio-cassette player, a video camera, a videotape recorder, an audio player, a DVD player, an air conditioner, a cellular phone, a display, a computer, a register, an electronic calculator, a copying machine, a printer, or a facsimile, or (2) a casing for the electrical and electronic equipment described in the (1).

EXAMPLES

The present invention is more specifically described by way of Examples. However, the present invention is by no means limited by these Examples. In each of Examples, characteristic values and evaluation results were determined in the following manner.

(1) Gel Permeation Chromatography (GPC)

The GPC measurement of the polyorganosiloxane was carried out under the following conditions.

Test apparatus: TOSOH HLC 8220
Column: TOSOH TSK-GEL GHXL-L, G4000HXL, G2000HXL
Solvent: tetrahydrofuran (THF)
Column temperature: 40° C.
Flow rate: 1.0 ml/min
Detector: RI
Injection concentration: 0.1 w/v %
Injection amount: 0.1 ml Standard polystyrene manufactured by Tosoh Corporation was used to obtain a calibration curve.

A differential molecular weight distribution curve can be obtained by such method as described below. First, the time curve of an intensity distribution detected with a RI detector (elution curve) was converted into a molecular weight distribution curve with respect to the logarithmic value of a molecular weight (log(M)) by using a calibration curve. Next, an integral molecular weight distribution curve with respect to the log(M) when the total area of the distribution curve was set to 100% was obtained. After that, a differential molecular weight distribution curve with respect to the log(M) can be obtained by differentiating the integral molecular weight distribution curve with respect to the log(M). It should be noted that a series of operations up to the acquisition of the differential molecular weight distribution curve can be typically performed with analysis software built in a GPC measuring apparatus. The FIGURE is a graph for showing an example of the differential molecular weight distribution curve to be obtained. In the graph, the log(M) value at which a dw/dlog(M) value becomes maximum is shown and a value obtained by integrating dw/dlog(M) over the range of $4.00 \leq \log(M) \leq 4.50$ is shown in a shaded area.

The GPC measurement of the polyorganosiloxane block (B) or the polyorganosiloxane block (B') in the polycarbonate-polyorganosiloxane copolymer was performed under the following conditions.

20 ml of methylene chloride was added to 4.3 g of the resultant PC-POS copolymer flake to completely dissolve the flake. While the solution was stirred with a magnetic stirrer, 20 ml of a solution of sodium hydroxide in methanol (obtained by mixing 48 mass % aqueous NaOH and methanol at a volume ratio of 1:9) was added to the solution, followed by stirring for 30 minutes. In order for a precipitated solid crystal derived from a PC to be dissolved, 25 ml of ion-exchanged water was added to the mixture, and the whole was stirred for 1 minute and then left at rest to be separated into an organic layer and an aqueous layer. Thus, the organic layer was obtained. The organic layer was washed by adding 15 vol % of 0.03 mol/L aqueous NaOH with respect to the organic layer to the organic layer and stirring the mixture, and then the mixture was subjected to settled separation to provide an organic layer; the foregoing operation was performed twice. The resultant organic layer was washed by adding 15 vol % of 0.2 mol/L hydrochloric acid with respect to the organic layer to the organic layer and stirring the mixture, and then the mixture was subjected to settled separation to provide an organic layer. Next, the organic layer was washed by adding 15 vol % of pure water with respect to the organic layer to the organic layer and stirring the mixture, and then the mixture was subjected to settled separation to provide an organic layer. The resultant organic layer was dried with a dryer at 60° C. for 16 hours. The spectrum of the resultant sample was measured by GPC. Here, it is found from the resultant GPC spectrum that when a molecular weight in terms of polystyrene is represented by M, the sample is formed of a low-molecular weight component derived from the PC having the maximum value at a log [M] of 2.0 or more and less than 3.0, and a POS component having the maximum value at a log[M] of 3.0 or more to less than 4.5. The molecular weight distribution of the used polyorganosiloxane can be identified by identifying the spectrum of the POS.

(2) Chain Length and Content of Polydimethylsiloxane

The chain length and content of a polydimethylsiloxane were calculated by NMR measurement from the integrated value ratio of a methyl group of the polydimethylsiloxane.

<Quantification Method for Chain Length of Polydimethylsiloxane>

$^1$H-NMR Measurement Conditions

NMR apparatus: ECA500 manufactured by JEOL Resonance Co., Ltd. Probe: 50TH5AT/FG2

Observed range: −5 to 15 ppm
Observation center: 5 ppm
Pulse repetition time: 9 sec
Pulse width: 45°
NMR sample tube: 5 φ
Sample amount: 45 to 55 mg
Solvent: deuterochloroform
Measurement temperature: room temperature
Number of scans: 256 times In the Case of Allylphenol-terminated Polydimethylsiloxane A: an integrated value of a methyl group in a dimethylsiloxane moiety observed around δ−0.02 to δ0.5
B: an integrated value of a methylene group at a benzyl position in allylphenol observed around δ2.50 to δ2.75
Chain length of polydimethylsiloxane=(A/6)/(B/4)

<Quantification Method for Content of Polydimethylsiloxane in PC-PDMS> e.g.) The quantification was performed by a quantification method for the copolymerization amount of a polydimethylsiloxane in a p-t-butylphenol (PTBP)-terminated polycarbonate obtained by copolymerizing an allylphenol-terminated polydimethylsiloxane. NMR apparatus: ECA-500 manufactured by JEOL Resonance Co., Ltd.

Probe: TH5 corresponding to 5φ NMR sample tube
Observed range: −5 to 15 ppm
Observation center: 5 ppm
Pulse repetition time: 9 sec
Pulse width: 45°
Number of scans: 256 times
NMR sample tube: 5 φ
Solvent: deuterochloroform
Measurement temperature: room temperature A: an integrated value of a methyl group in a BPA moiety observed around δ1.5 to δ1.9
B: an integrated value of a methyl group in a dimethylsiloxane moiety observed around δ−0.02 to δ0.3
C: an integrated value of a butyl group in a p-tert-butylphenyl moiety observed around δ1.2 to δ1.4
a=A/6
b=B/6
c=C/9
T=a+b+c
f=a/T×100
g=b/T×100
h=c/T×100
TW=f×254+g×74.1+h×149
PDMS (wt %)=g×74.1/TW×100

(3) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times M v^{0.83}$$

<Production of Polycarbonate Oligomer>

To 5.6 mass % aqueous sodium hydroxide, 2,000 ppm of sodium dithionite with respect to bisphenol A (BPA) (to be dissolved later) was added. BPA was dissolved in the solution so that the concentration of BPA became 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket. The reaction liquid that had exited the tubular reactor was continuously introduced into a baffled vessel-type reactor having an internal volume of 40 L provided with a sweptback blade, and then the solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to thereby perform a reaction. The reaction liquid flowing out of the vessel-type reactor was continuously taken out, and then an aqueous phase was separated and removed by leaving the liquid at rest, followed by the collection of a methylene chloride phase.

The concentration of the polycarbonate oligomer thus obtained was 330 g/L and the concentration of a chloroformate group thereof was 0.71 mol/L.

<Production of PC-POS Copolymer (E-1)>

Production Example 1

Production of SiPC-a1

13.5 L of the polycarbonate oligomer solution produced as described above, 11.4 L of methylene chloride, a solution obtained by dissolving 350 g of an allylphenol terminal-modified polydimethylsiloxane (a polydimethylsiloxane is hereinafter sometimes referred to as "PDMS") having an average chain length n of 64, a log(M) at which dw/dlog(M) became the maximum value of 3.7, and a ratio of a value obtained by integrating the dw/dlog(M) value over the log(M) range of 4.00 to 4.50 to a value obtained by integrating the dw/dlog(M) value over the entire range of the log(M) (hereinafter, in Examples, the ratio is sometimes referred to as "ratio of a log(M) of 4.00 to 4.50") of 15.0% in 800 ml of methylene chloride, and 7.9 mL of triethylamine were loaded into a 50-liter vessel-type reactor including a baffle board, a paddle-type stirring blade, and a cooling jacket. 1,284 g of 6.4 mass % aqueous sodium hydroxide was added to the mixture under stirring, and a reaction between the polycarbonate oligomer and the allylphenol terminal-modified PDMS was performed for 20 minutes. The allylphenol terminal-modified PDMS used here is obtained by blending, at a mass ratio of 5:5, an allylphenol terminal-modified PDMS having an average chain length n of 34, a log (M) at which dw/dlog (M) becomes the maximum value of 3.6, and a ratio of a log(M) of 4.00 to 4.50 of 5.6%, and an allylphenol terminal-modified PDMS having an average chain length n of 92, a log (M) at which dw/dlog (M) becomes the maximum value of 4.1, and a ratio of a log(M) of 4.00 to 4.50 of 34.8%.

A solution of p-t-butylphenol (PTBP) in methylene chloride (prepared by dissolving 128.1 g of PTBP in 1.3 L of methylene chloride) and a solution of BPA in aqueous sodium hydroxide (prepared by dissolving 997 g of BPA in an aqueous solution prepared by dissolving 567 g of NaOH and 1.9 g of sodium dithionite in 8.3 L of water) were added to the polymerization liquid, and the mixture was subjected to a polymerization reaction for 40 minutes.

10 L of methylene chloride was added to the resultant for dilution, and the mixture was stirred for 20 minutes. After that, the mixture was separated into an organic phase containing a PC-PDMS, and an aqueous phase containing excess amounts of BPA and NaOH, and the organic phase was isolated.

A solution of the PC-PDMS in methylene chloride thus obtained was sequentially washed with 0.03 mol/L aqueous NaOH and 0.2 N hydrochloric acid in amounts of 15 vol % each with respect to the solution. Next, the solution was repeatedly washed with pure water until an electric conductivity in an aqueous phase after the washing became 0.01 µS/m or less.

A solution of the polycarbonate in methylene chloride obtained by the washing was concentrated and pulverized, and the resultant flake was dried under reduced pressure at 120° C. The flake had a PDMS concentration of 6.0 mass %, a viscosity number measured in conformity with ISO 1628-4 (1999) of 47.7, and a viscosity-average molecular weight My of 17,800. Thus, a SiPC-a1 was obtained as the PC-PDMS (E-1).

<Production of Aromatic Polycarbonate Resin (E-2a)>

Production Example 2

Production of SiPC-b1

A flake of a PC-POS copolymer (SiPC-b1) was obtained in the same manner as in Production Example 1 except that the allylphenol terminal-modified PDMS used in Production Example 1 was changed to an allylphenol terminal-modified PDMS having an average chain length n of 34, a log (M) at which dw/dlog (M) took the maximum value of 3.6, and a ratio of a log (M) of 4.00 to 4.50 of 5.6%. The resultant flake had a PDMS amount of 6.0 mass %, a viscosity number measured in conformity with ISO 1628-4 (1999) of 47.3, and a viscosity-average molecular weight of 17,500.

<Production of Aromatic Polycarbonate Resin (E-2b)>

Production Example 3

Production of SiPC-c1

A flake of a PC-POS copolymer (SiPC-c1) was obtained in the same manner as in Production Example 1 except that the allylphenol terminal-modified PDMS used in Production Example 1 was changed to 350 g of an allylphenol terminal-modified PDMS having an average chain length n of 92, a log(M) at which dw/dlog(M) took the maximum value of 4.1, and a ratio of a log(M) of 4.00 to 4.50 of 34.8%. The resultant flake had a PDMS amount of 6.0 mass %, a viscosity number measured in conformity with ISO 1628-4 (1999) of 47.4, and a viscosity-average molecular weight of 17,700.

<Aromatic Polycarbonate Resin (E-2c)>

PC-1: aromatic homopolycarbonate resin [manufactured by Idemitsu Kosan Co., Ltd., TARFLON FN1700 (product name), viscosity-average molecular weight=17,700]

Examples 1 to 5 and Comparative Examples 1 to 7

Any one of the PC-POS copolymers obtained in Production Examples 1 to 3 and other respective components were mixed at a blending ratio (unit; part(s) by mass) shown in Table 1 and Table 2, and the mixture was supplied to a vented twin-screw extruder (manufactured by Toshiba Machine Co., Ltd., TEM-35B) and melt-kneaded at a screw revolution number of 150 rpm, an ejection amount of 20 kg/hr, and a resin temperature of 295 to 300° C. to provide an evaluation pellet sample. The evaluation pellet sample was dried at 120° C. for 8 hours, and was then subjected to injection molding with an injection molding machine (manufactured by Nissei Plastic Industrial Co., Ltd., NEX110, screw diameter: 36=Φ) at a cylinder temperature of 280° C. and a die temperature of 80° C. to produce test pieces for performing an Izod test (two test pieces each measuring 63 mm×13 mm×3.2 mm). Further, the dried evaluation pellet sample was molded with an injection molding machine (manufactured by Niigata Machine Techno Co., Ltd., MD50XB, screw diameter: 30=Φ) to produce a test piece for performing a transparency evaluation test (a three-stage plate measuring 90 mm×50 mm, 3-millimeter thick portion: 45 m×50 mm, 2-millimeter thick portion: 22.5 mm×50 mm, 1-millimeter thick portion: 22.5 mm×50 mm). In addition, any other component is shown below. The components and the results of evaluation tests are shown in Tables 1 and 2.

[Evaluation Test]

<Total Light Transmittance (Tt) and Haze Value>

The total light transmittance of the 3-millimeter thick portion of the three-stage plate was measured on the basis of ISO 13468 three times, and the average of the measured values was determined. The haze value thereof was also measured on the basis of ISO 14782 three times, and the average of the measured values was determined.

<Izod Impact Strength>

A notched Izod impact strength at a measurement temperature of −40° C. was measured in conformity with ASTM Standard D-256. A judgment criterion for the notched Izod impact strength is as follows: a notched Izod impact strength at −40° C. of 40 kJ/m² or more means that impact resistance at low temperature is excellent.

<Other Component>

Antioxidant: "IRGAFOS 168 (product name)" [tris(2,4-di-t-butylphenyl) phosphite, manufactured by BASF Japan]

TABLE 1

|  |  |  | Examples |  |  |  |  |
|---|---|---|---|---|---|---|---|
|  |  |  | 1 | 2 | 3 | 4 | 5 |
| E-1 |  | SiPC-a1 | 80 | 50 | 40 | 60 | 20 |
| E-2 | (E-2a) | SiPC-b1 |  | 50 | 60 |  |  |
|  | (E-2b) | SiPC-c1 | 20 |  |  |  | 20 |
|  | (E-2c) | PC-1 |  |  |  | 40 | 60 |
| Antioxidant |  | IRGAFOS 168 | 0.1 | 0.1 | 0.1 | 0.1 | 0.1 |
| Content of PDMS in (E-1) + (E-2) |  | wt % | 6.0 | 5.9 | 6.0 | 3.6 | 2.4 |
| Viscosity-average molecular weight of (E-1) + (E-2) (Mv) |  |  | 17,400 | 17,600 | 17,500 | 17,400 | 17,300 |
| Tt (three-stage plate, 3 mmt) |  | % | 84 | 88 | 88 | 86 | 82 |
| Haze value (three-stage plate, 3 mmt) |  | % | 2.0 | 0.9 | 0.7 | 1.5 | 3.3 |
| Izod impact strength at −40° C. |  | kJ/m$^2$ | 56 | 58 | 55 | 53 | 49 |

TABLE 2

|  |  |  | Comparative Examples |  |  |  |  |  |  |
|---|---|---|---|---|---|---|---|---|---|
|  |  |  | 1 | 2 | 3 | 4 | 5 | 6 | 7 |
| E-1 |  | SiPC-a1 |  |  |  |  |  |  |  |
| E-2 | (E-2a) | SiPC-b1 | 30 | 40 | 50 | 42 | 20 | 100 |  |
|  | (E-2b) | SiPC-c1 | 70 | 60 | 50 | 18 | 20 |  | 100 |
|  | (E-2c) | PC-1 |  |  |  | 40 | 60 |  |  |
| Antioxidant |  | IRGAFOS 168 | 0.1 | 0.1 | 0.1 | 0.1 | 0.1 | 0.1 | 0.1 |
| Content of PDMS in (E-1) + (E-2) |  | wt % | 6.0 | 6.0 | 6.0 | 3.6 | 2.4 | 6.0 | 6.0 |
| Viscosity-average molecular weight of (E-1) + (E-2) (Mv) |  |  | 17,000 | 17,200 | 17,600 | 17,300 | 17,700 | 17,500 | 17,700 |
| Tt (three-stage plate, 3 mmt) |  | % | 77 | 79 | 82 | 86 | 83 | 89 | 70 |
| Haze value (three-stage plate, 3 mmt) |  | % | 6.5 | 4.1 | 3.5 | 1.6 | 2.6 | 0.8 | 18.7 |
| Izod impact strength at −40° C. |  | kJ/m$^2$ | 56 | 58 | 54 | 30 | 29 | 35 | 55 |

As is apparent from Table 1, each of the molded bodies obtained from the polycarbonate-based resin compositions of Examples 1 to 5 is excellent in both transparency and impact resistance, and is excellent particularly in impact resistance under low temperature.

Meanwhile, as shown in Comparative Examples 1 to 7, when a polycarbonate-based resin composition in which a specific polycarbonate-polyorganosiloxane copolymer whose polyorganosiloxane has a controlled molecular weight distribution and an aromatic polycarbonate resin are combined is not used, a molded body achieving both transparency and impact resistance at low temperature is not obtained. Specifically, the following results were obtained: in each of Comparative Examples 1 to 3 and 7 each showing impact resistance under low temperature comparable to that of each of Examples 1 to 5, transparency was poor; and in each of Comparative Examples 4 to 6 each showing transparency comparable to that of each of Examples 1 to 5, impact resistance at low temperature was poor.

INDUSTRIAL APPLICABILITY

The polycarbonate-based resin composition obtained in the present invention can be suitably used in parts for electrical and electronic equipment, parts for the interior and exterior of lighting equipment, parts for the interior and exterior of a vehicle, food trays, and eating utensils because the composition is excellent in transparency and low-temperature impact resistance.

The invention claimed is:
1. A polycarbonate-based resin composition, comprising:
10 to 90 mass % of a polycarbonate-polyorganosiloxane copolymer (E-1); and
10 to 90 mass % of an aromatic polycarbonate resin (E-2) except the polycarbonate-polyorganosiloxane copolymer (E-1), wherein:

the polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II) wherein the polyorganosiloxane block (B) has an average chain length of 40 to 85; and in a differential molecular weight distribution curve obtained from measurement of the polyorganosiloxane block (B) by gel permeation chromatography (GPC) using a polystyrene calibration curve, the curve having an axis of abscissa indicating a logarithmic value log(M) of a molecular weight M and an axis of ordinate indicating dw/dlog(M) obtained by differentiating a concentration fraction w with respect to the logarithmic value log(M) of the molecular weight, (1) a dw/dlog(M) value becomes maximum in a range of 3.4≤log(M)≤4.0, and (2) a ratio of a value obtained by integrating the dw/dlog(M) value over a range of 4.00≤log(M)≤4.50 to a value obtained by integrating the dw/dlog(M) value over an entire range of the log(M) in the differential molecular weight distribution curve is 6.5 to 40%;

the total light transmittance of a molded body, having a thickness of 3 mm, of the polycarbonate-based resin composition is 82% or more, as determined in conformity with ISO 13468:

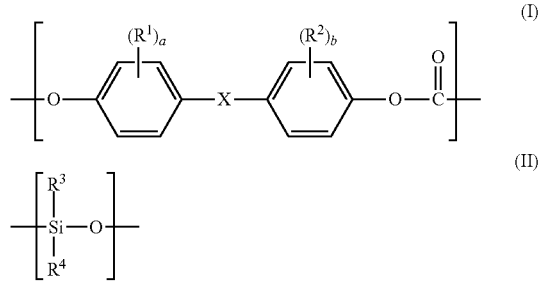

wherein $R^1$ and $R^2$ each independently represent, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4, wherein the GPC has been measured following alkaline decomposition by sodium hydroxide in methanol with the following parameters:
(i) solvent is THF,
(ii) a column temperature of 40° C.,
(iii) a flow rate of 1.0 ml/min,
(iv) an RI Detector,
(v) an injection concentration of 0.1 w/v %,
(vi) an injection amount of 0.1 ml, and
(vii) the GPC comprises a first column and a second column, each having a length of 30 cm respectively, with a different pore size, the first column's packing material pore size is 20 nm and the second column's packing material pore size is 2 nm, and each of which has a packing material has the following conditions: particle matrix is polystyrene divinylbenzene (PS-DVB), particle size is 5 µm.

2. A polycarbonate-based resin composition, comprising:
10 to 90 mass % of a polycarbonate-polyorganosiloxane copolymer (E-1); and
10 to 90 mass % of an aromatic polycarbonate resin (E-2) except the polycarbonate-polyorganosiloxane copolymer (E-1), wherein:
the polycarbonate-polyorganosiloxane copolymer (E-1) has a polycarbonate block (A) formed of a repeating unit represented by the following general formula (I) and a polyorganosiloxane block (B) containing a repeating unit represented by the following general formula (II) wherein the polyorganosiloxane block (B) has an average chain length of 40 to 85; and
the polycarbonate-based resin composition uses, as a raw material, a polyorganosiloxane having the following features: in a differential molecular weight distribution curve obtained from measurement by gel permeation chromatography using a polystyrene calibration curve, the curve having an axis of abscissa indicating a logarithmic value log(M) of a molecular weight M and an axis of ordinate indicating dw/dlog(M) obtained by differentiating a concentration fraction w with respect to the logarithmic value log(M) of the molecular weight,
(1) a dw/dlog(M) value becomes maximum in a range of 3.4≤log(M)≤4.0, and
(2) a ratio of a value obtained by integrating the dw/dlog(M) value over a range of 4.00≤log(M)≤4.50 to a value obtained by integrating the dw/dlog(M) value over an entire range of the log(M) in the differential molecular weight distribution curve is 6.5 to 40%;
the total light transmittance of a molded body, having a thickness of 3 mm, of the polycarbonate-based resin composition is 82% or more, as determined in conformity with ISO 13468:

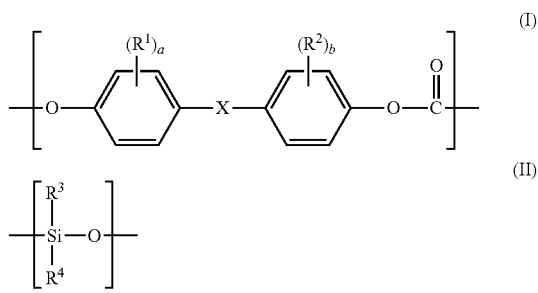

wherein $R^1$ and $R^2$ each independently represent an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4, wherein the GPC has been measured following alkaline decomposition by sodium hydroxide in methanol with the following parameters:
(i) solvent is THF,
(ii) a column temperature of 40° C.,
(iii) a flow rate of 1.0 ml/min,
(iv) an RI Detector,
(v) an injection concentration of 0.1 w/v %,
(vi) an injection amount of 0.1 ml, and
(vii) the GPC comprises a first column and a second column, each having a length of 30 cm respectively, with a different pore size, the first column's packing material pore size is 20 nm and the second column's packing material pore size is 2 nm, and each of which has a
packing material has the following conditions: particle matrix is polystyrene divinylbenzene (PS-DVB), particle size is 5 µm.

3. The polycarbonate-based resin composition according to claim 1, wherein the aromatic polycarbonate resin (E-2) contains an aromatic homopolycarbonate resin.

4. The polycarbonate-based resin composition according to claim 1, wherein the aromatic polycarbonate resin (E-2) contains a polycarbonate-polyorganosiloxane copolymer having a polycarbonate block (A') formed of a repeating unit represented by the general formula (I) and a polyorganosiloxane block (B') containing a repeating unit represented by the general formula (II).

5. The polycarbonate-based resin composition according to claim 4, wherein the polyorganosiloxane block (B') has an average chain length of 20 or more to less than 60.

6. The polycarbonate-based resin composition according to claim 4, wherein the polyorganosiloxane block (B') has an average chain length of 60 to 500.

7. The polycarbonate-based resin composition according to claim 1, wherein a content of the polyorganosiloxane block (B) in the polycarbonate-polyorganosiloxane copolymer (E-1) is 0.5 to 20.0 mass %.

8. The polycarbonate-based resin composition according to claim 1, wherein the polycarbonate-polyorganosiloxane copolymer (E-1) has a viscosity-average molecular weight of 12,000 to 40,000, as calculated from Schnell's equation: $[\eta]=1.23\times10^{-5}\times Mv^{0.83}$ by using a limited viscosity $[\eta]$ determined through the measurement of viscosity of a methylene chloride solution at 20° C. with an Ubbelohde-type viscometer.

9. The polycarbonate-based resin composition according to claim 1, wherein in the general formula (I), a and b each represent 0, and X represents a single bond or an alkylidene group having 2 to 8 carbon atoms.

10. The polycarbonate-based resin composition according to claim 9, wherein in the general formula (I), a and b each represent 0, and X represents an alkylidene group having 3 carbon atoms.

11. The polycarbonate-based resin composition according to claim 1, wherein in the general formula (II), $R^3$ and $R^4$ each represent a methyl group.

12. A molded body, which is obtained by molding the polycarbonate-based resin composition of claim 1.

13. The molded body according to claim 12, wherein the molded body comprises a part for electrical and electronic equipment.

14. The polycarbonate-based resin composition according to claim 1, wherein the average chain length of the polyorganosiloxane block (B) in the polycarbonate-polyorganosiloxane copolymer (E-1) is 58 to 85.

15. The polycarbonate-based resin composition according to claim 1, wherein the content of the polyorganosiloxane block containing a repeating unit represented by the general formula (II) in the polycarbonate-polyorganosiloxane copolymer (E-1) and the aromatic polycarbonate resin (E-2) is 1.5 to 6.0 mass %.

* * * * *